United States Patent [19]

Souketani et al.

[11] Patent Number: 5,007,773
[45] Date of Patent: Apr. 16, 1991

[54] SHAVING CUTTER

[75] Inventors: Koichi Souketani; Yukio Ito, both of Toyama; Yoshio Sasaki, Toyota; Teiji Kurita, Toyota; Jun Tamiya, Toyota, all of Japan

[73] Assignee: Nachi-Fujikoshi Corporation, Toyama, Japan

[21] Appl. No.: 366,178

[22] Filed: Jun. 14, 1989

[30] Foreign Application Priority Data

Jun. 17, 1988 [JP] Japan ................... 63-149539

[51] Int. Cl.$^5$ ............................. B23F 21/00
[52] U.S. Cl. ...................... 407/27; 407/28; 407/29; 409/38; 409/39
[58] Field of Search .......... 407/27, 28, 29, 22, 407/20, 24, 69, 70; 409/38, 39, 37, 40

[56] References Cited

U.S. PATENT DOCUMENTS

| | | | |
|---|---|---|---|
| 2,278,737 | 4/1942 | Praeg | 407/27 |
| 2,295,148 | 9/1942 | Witham | 407/27 |
| 3,147,535 | 9/1964 | Wildhaber | 407/27 |
| 3,300,833 | 1/1967 | Daniel | 407/27 |
| 3,629,920 | 5/1970 | Loos | 407/27 |

FOREIGN PATENT DOCUMENTS

| | | | |
|---|---|---|---|
| 1552746 | 7/1969 | Fed. Rep. of Germany | 407/27 |
| 1104135 | 6/1955 | France | 407/27 |
| 474443 | 1/1936 | United Kingdom | 407/27 |

Primary Examiner—Frederick R. Schmidt
Assistant Examiner—Blynn Shideler
Attorney, Agent, or Firm—Spencer & Frank

[57] ABSTRACT

A helical toothed shaving cutter used for finishing or shaving of gears as well as a shaving cutter suitable for plunge cut shaving. The shaving cutter includes a multiplicity of ribs forming the cutter tooth flanks, arranged in a manner substantially symmetrically with respect to each axial centerline of each of the cutter teeth, and each of the ribs has both a positive rake angle at its leading cutting edge and a negative rake angle at its trailing cutting edge as viewed in the direction of lateral sliding direction of along the tooth trace cutter.

14 Claims, 8 Drawing Sheets

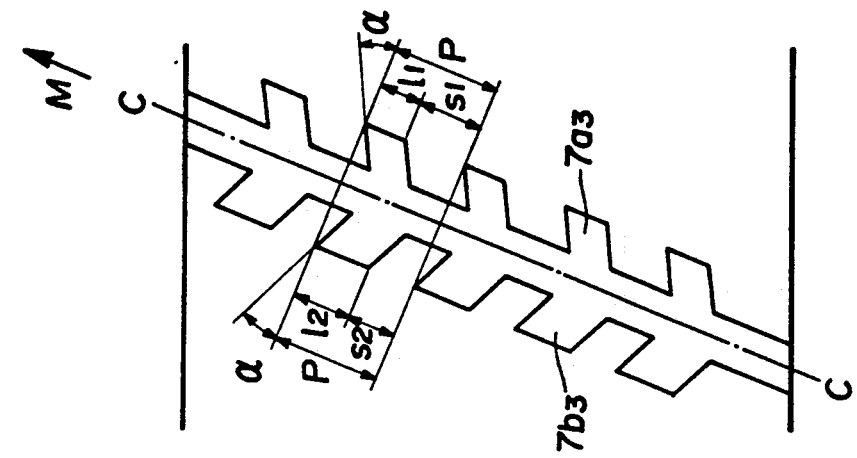
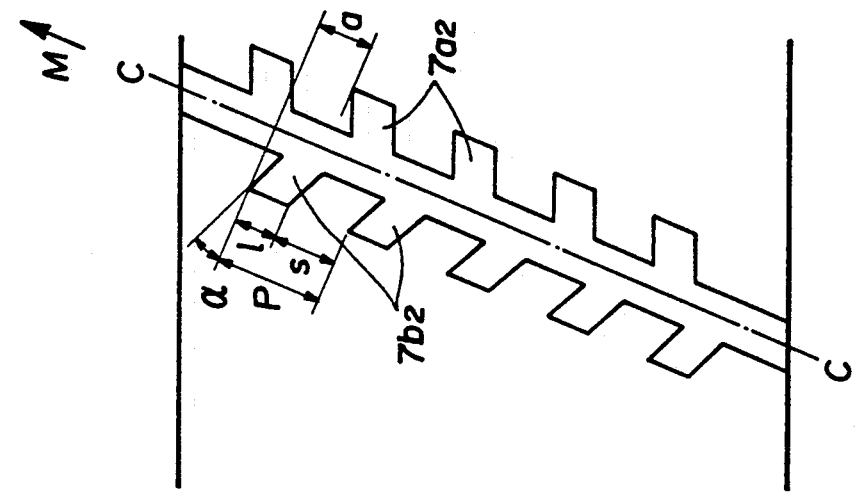
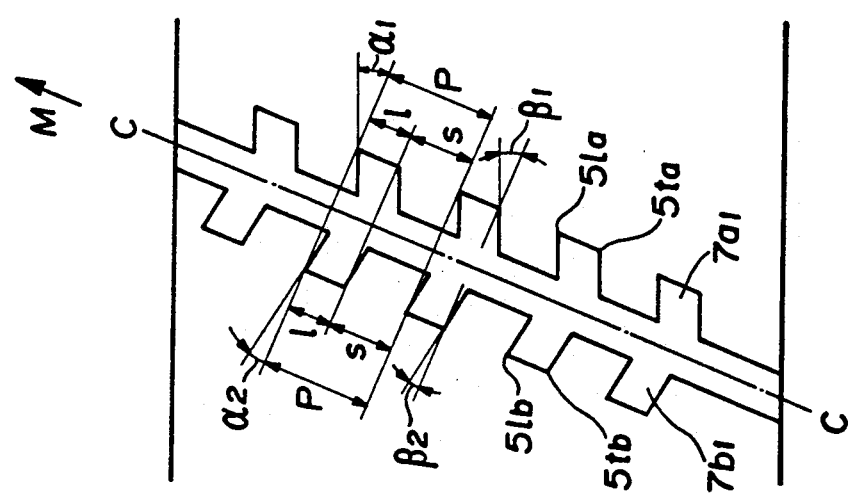

Tooth profiles of all gear teeth measured respective shaved gears, wherein each zero (0) indicates measured scutter of all following teeth 1 to 18 respectively → tooth Nos.

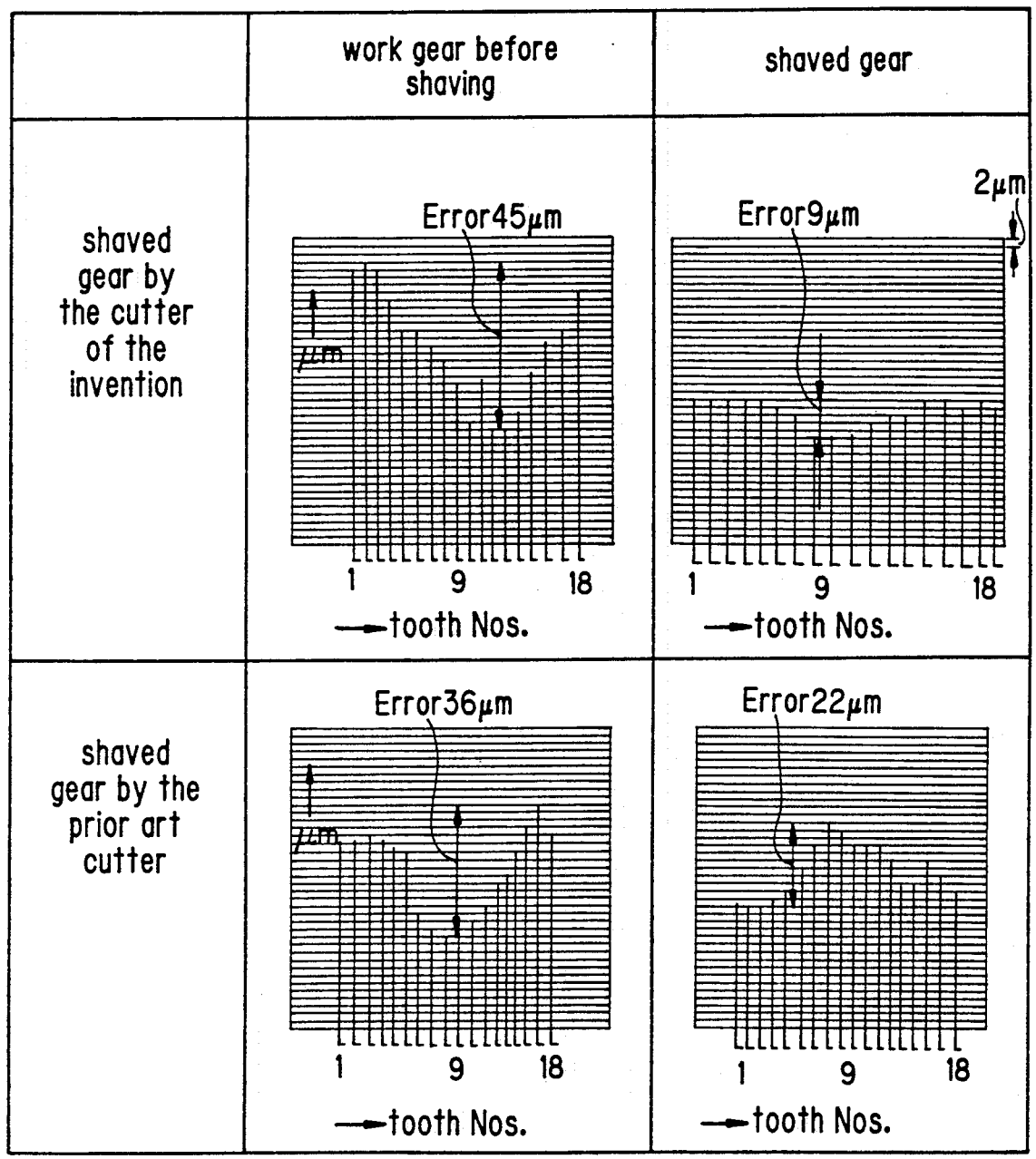

FIG. 12a
PRIOR ART
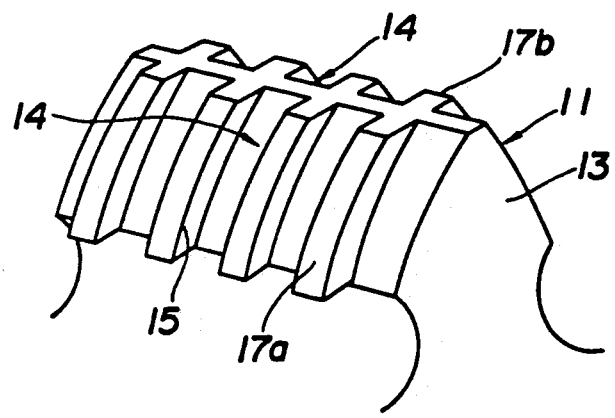
FIG. 12c
PRIOR ART
FIG. 12d
PRIOR ART
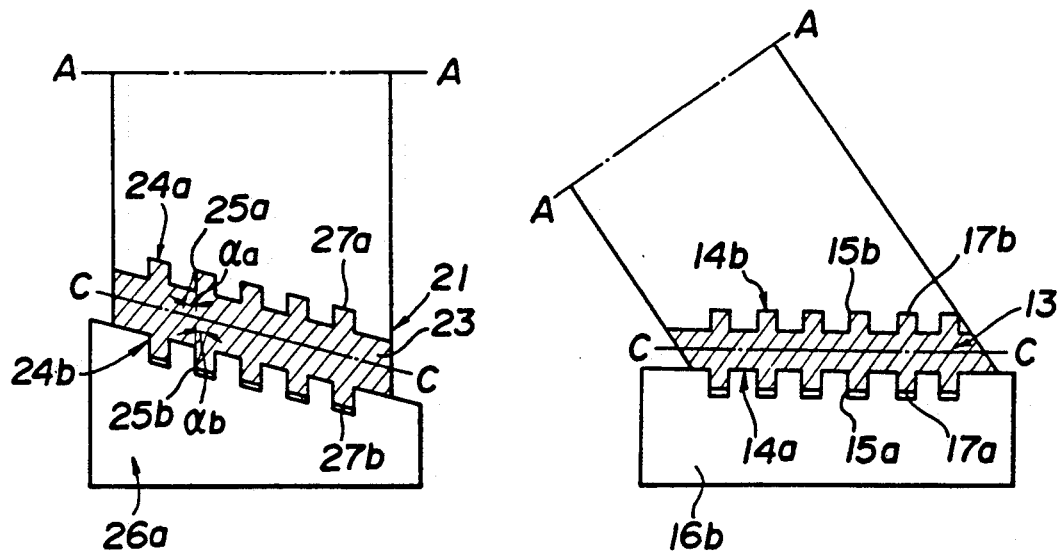

SHAVING CUTTER

BACKGROUND OF THE INVENTION

1. Field of the Invention

The present invention is directed generally to a shaving cutter for shaving or finishing gears, which cutter is provided with a multiplicity of serrations extending on the cutter tooth flanks and including ribs made up by the serrations of the cutter, and the ribs forming the cutter tooth flanks.

The present invention relates more particularly to a shaving cutter suitable for a plunge cut shaving method.

2. Description of the Prior Art

A plunge cut shaving processing method which is commonly employed involves the following steps. As illustrated in FIGS. 3 and 12b, a work gear axis (B—B) and a shaving cutter axis (A—A) are set up at a deliberately calculated cross axis angle. Then the teeth 3, 13 of the shaving cutter 1, 11 are urged with a force and mechanically intruded between the teeth 3a of a work gear 2 in such a direction as to shorten an inter-axis distance (l) between both axes (A—A), (B—B). Meanwhile, lateral sliding caused by contact pressure of the amount Vs shown in FIG. 12b is forced to take place between both teeth due to rotating of the shaving cutter with intermeshing the work gear without imparting an axial feed to both of them. Note that the symbol Vc represents a rotational speed vector of the shaving currer1, 11 at the contact point on the cutter tooth flank in the peripheral direction, Vg denotes a rotational speed vector of a work gear and the amount Vs designates a lateral sliding speed vector along the tooth trace produced due to a difference between vectors Vc and Vg.

In a prior art shaving cutter, a multiplicity of serrations 14 are, as depicted in FIG. 12a, formed on respective tooth flanks formed by the ribs 17a and 17b of the shaving cutter 11 in order to obtain cutting action by utilizing the lateral sliding force, thus providing a multiplicity of serrated cutting edges 15 of ribs.

Generally, a cutter axis intersects a work gear axis (B—B) to be shaved at an angle of approximately 4°~15° which are varied by gear element, whereby the great majority of cutters have their teeth each assuming a helical gear configuration (i.e. each tooth has a helix angle).

Hence, in a prior art shaving cutter as shown in FIG. 12c, the cutter is provided with ribs 27a, 27b, of the serration 24a, 24b orthogonal to a cutter axis (A—A), called axial serrations. These serrations 24a, 24b are manufactured by employing a combshaped cutting tool 26a.

In another prior art shaving cutter illustrated in FIG. 12d, there are provided ribs 17a, 17b of the serrations 14a, 14b orthogonal to the centerline of each of the tooth flanks (C—C), called normal serrations. These serrations 14a, 14b are also manufactured by use of a comb-shaped cutting tool 16b.

However, as illustrate in FIG. 12c, rake angles or hook angles $\alpha a$ and $\alpha b$ at cutting edges 25a, 25b of the cutter 21 having the axial serrations 24a, 24b, are completely reverse in positive and negative, with respect to upper and lower tooth flanks as viewed in FIG. 12c formed by the ribs 27a, 27b of the serration, so that the surface finish on both tooth flanks of the shaved gear becomes nonuniform.

On the contrary, in the other prior art cutter having the normal serrations 14a, 14b as seen in FIG. 12d, since both rake angles or hook angles (FIG. 12c, $\alpha a$, $\alpha b$) are perpendicular to the tooth flank center line (C—C), the surface finish effected by this cutter on both sides of the tooth flanks of the work gear become more symmetric. Thus, actual cutting amounts, as well as surface roughness on both side of the worked gear flanks are symmetrical, on one hand, however, on the other hand, it is known that the absolute cutting quality or sharpness is considerably deteriorated. More specifically, apropos of the shaving work, since the depth of a cut (0.002~0.010 mm) per one gear rotation is remarkably less compared with general machining, a high bite property of the cutting edge is required. For this reason, a shaving cutter having a positive rake or hook angle has more advantages. Whereas in the above normal serration cutter, the rake angle is zero. This implies that the rake angle does not contribute to the cutting quality. As a result, the above normal serration cutter, though it is one of the finishing tools, does not always achieve a desirable result, because the tooth profile and the deflection or runout of the tooth grooves of shaved gear tends to follow the accuracy of the pre-shaving finish (processing).

SUMMARY OF THE INVENTION

An object of the invention is to provide a shaving cutter suitable for a plunge cut shaving method. Another object of the invention is to provide a shaving cutter which utilizes a burnishing effect peculiar, to a plunge shaving during reverse rotation thereof, thus attaining high accurate shaving work of gears to be finished.

These and other objects are attainable in a shaving cutter for shaving of gears which cutter is provided with a multiplicity of serrations extending on the cutter tooth flanks and including ribs made up by the serrations of the cutter, the ribs forming the cutter tooth flanks, the improvement wherein the ribs are arranged in a manner substantially symmetrically with respect to each axial center line of each of the cutter teeth and each of the ribs has both a positive rake angle at its leading cutting edge and a negative rake angle at its trailing cutting edge as viewed in the lateral sliding direction of the teeth along the tooth trace of the cutter.

By such an arrangement, the leading cutting edges each having a positive rake angle to perform high and uniform cutting or shaving action on both sides of each work gear tooth, whereas the trailing cutting edges each having a negative rake angle serve to uniformly finish both sides of each tooth flank to be shaved by utilizing a burnishing effect peculiar to plunge shaving during reverse rotations thereof, thus attaining a highly accurate shaving work of gears to be shaved or finished.

More particularly, a work gear and a shaving cutter, which have already meshed with each other, are rotated by driving the shaving cutter, and a cutting process is initiated by providing a plunge feed in an axial direction relative to each other. Then A5 the tooth flanks of the gears is finished during the plunge feed. In the meantime, the rotation of the shaving cutter is unidirectionally fixed. For this reason, a lateral sliding speed vector Vs at the leading cutting edges of the shaving cutter in regards to the tooth flanks of the work gear is, as depicted in FIG. 2, limited to one direction. The cutting process is effected only at each leading cutting edge with a positive rake angle ($\alpha$) of both sides of each of the tooth flanks to which the cutting process is assigned at that time. On the other hand, at a finishing stage the shaving cutter is rotated in a reverse direction, and hence each of the trailing cutting edges with a negative rake angle ($\beta$) effects also finishing work on both of each of the work gear tooth flanks. As a result, each of the work gear tooth flanks are uniformly well finished by virtue of the burnishing effect inherent in the plunge shaving.

BRIEF DESCRIPTION OF THE DRAWINGS:

Other objects and advantages of the invention will become apparent during the following discussion in conjunction with the accompanying drawings, in which:

FIGS. 4 to 8 are different embodiments of the present invention in which only one tooth crest of each of the shaving cutters is shown respectively in top view.

FIGS. 9 to 11 are comparative charts, in which FIG. 9 shows a comparison in surface finish of each of showed gear tooth flanks respectively shaved by the cutter according to the present invention and the prior art cutter, FIG. 10 shows a similar comparison in tooth profiles of all teeth of each of shaved gears, and FIG. 11 shows comparison of the runout of all tooth grooves of each of shaved gears.

FIG. 12a is a partial perspective view depicting a tooth of a PRIOR ART cutter;

FIG. 12b is a view corresponding to FIG. 2, showing a cutting operation of the PRIOR ART cutter of FIG. 12a; and FIGS. 12c and 12d are schematic views each illustrating respective teeth of PRIOR ART cutters together with their manufacturing states.

DETAILED DESCRIPTION OF THE ILLUSTRATED EMBODIMENTS

Figure 1:
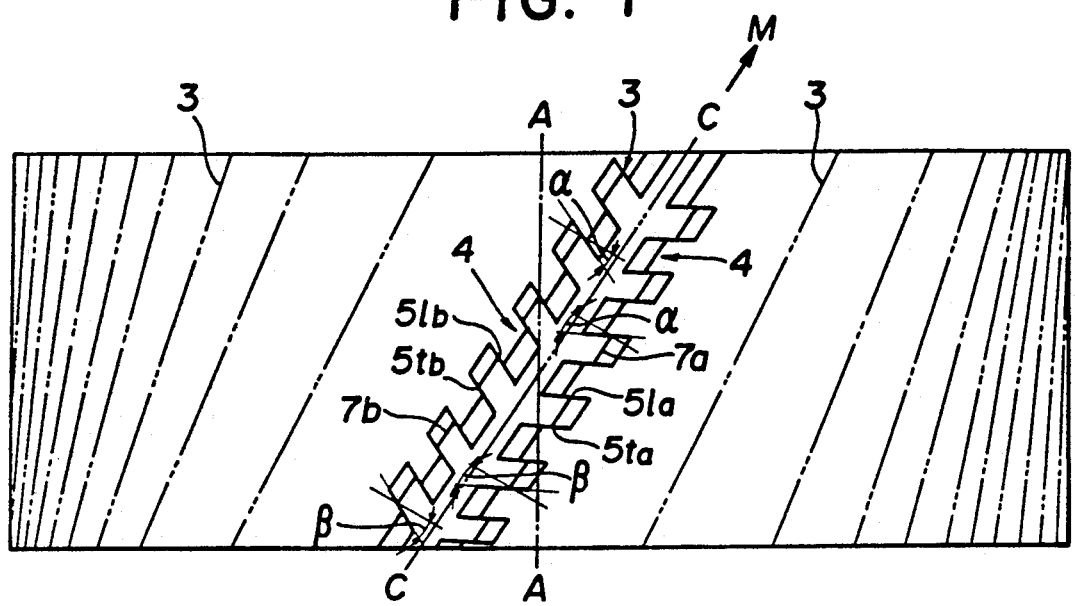
FIG. 1 is an enlarged top view of the shaving cutter of one embodiment of the present invention, in which only one tooth crest is shown and the other teeth are depicted in two dotted lines for simplicity.
Figure 12B:
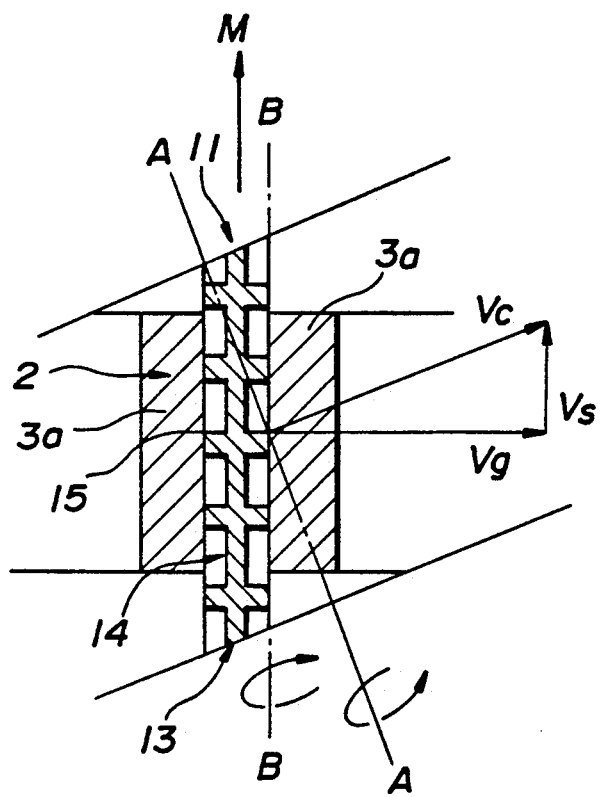

Illustrative embodiments of the present invention will hereinafter be described with reference to the accompanying drawings. Turning to FIG. 1, a helical-toothed shaving cutter is formed with a multiplicity of teeth 3 as in ordinary helical gears. Each tooth 3 is provided with a multiplicity of serrations 4 extending on the cutter tooth flanks, likewisely as already seen from FIG. 12a, and including ribs 7a, 7b formed to define cutting edges, made up by the serrations 4. The ribs 7a, 7b form the cutter tooth flanks or tooth faces. The ribs 7a, 7b are arranged in a manner substantially symmetrically with respect to each axial center line (C—C) of the cutter teeth. Further, each of the ribs 7a, 7b has both a positive rake angle ($\alpha$) at its leading cutting edges 51a, 51b, and a negative rake angle ($\beta$) at its trailing cutting edges 5ta, 5tb, as viewed in the direction of the direction A6 of the cutter 1, lateral sliding along the tooth trace. This negative rake angle ($\beta$) is so provided that it acts during the opposite rotation of the cutter 1, i.e. the counter-feeding direction (N) of the cutter 1, for burnishing of the worked gear flanks, since ribs 7a, 7b are formed substantially in linear symmetry with respect to the center line (C—C) of the cutter teeth. Now in order to obtain an actual test result, the cutting operation is performed in a following manner.

EXAMPLE

Figure 2:
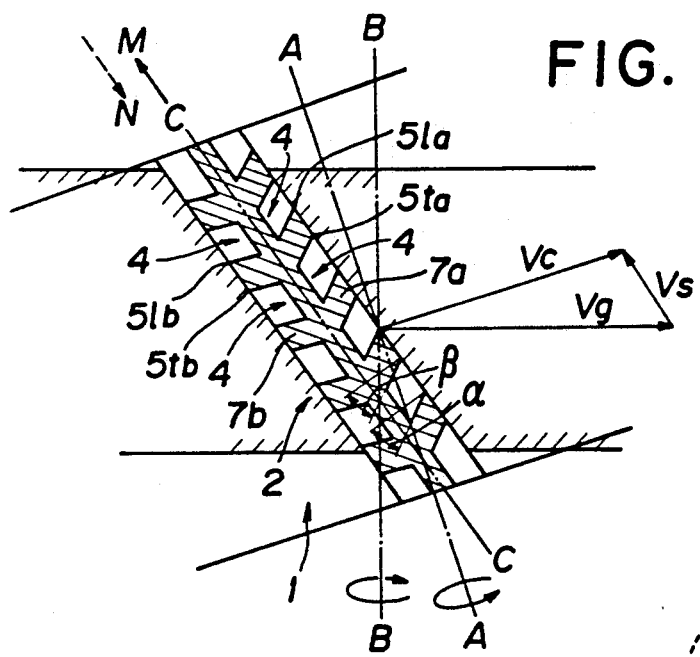
FIG. 2 is a partial section view, taken substantially along the line P—P of FIG. 3, of a cutting operation in accordance with the present invention.
Figure 3:
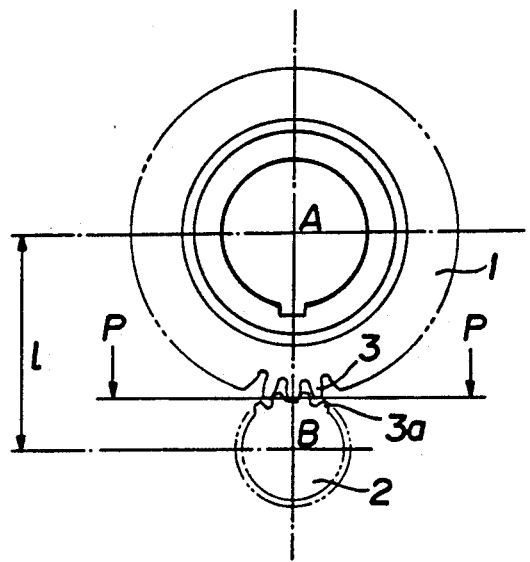
FIG. 3 is a front elevational view showing the cutting situation, in which a cutter axis (A—A) and work gear axis (B—B) is intersected at a predetermined cross-axis angle as seen in FIG. 2.

As illustrated FIG. 2, a work gear axis (B—B) is set up to intersect and form a meshing engagement with a cutter axis (A—A) at a predetermined cross-axis angle thereof, and a cutter 1 is rotated in the same manner as that of a plunge shaving method. Subsequently, as depicted in FIG. 3, the feeding of the cutter 1 is imparted in such a direction as to reduce an inter-axis distance (l) therebetween. In one example, a cutting process is performed at a rotational frequency 170 rpm (starting with right rotations) with a feed ratio of 0.6 mm/min. Other dimensions are:

|  | Work-gear | Shaving cutter |
| --- | --- | --- |
| Module | 2.5 mm | 2.5 mm |
| Presume angle | 20° | 20° |
| Nos. of teeth | 18 | 89 |
| Helix angle | 31° RH | 16° LH |
| Tooth width | 26 mm | 34 mm |

A7

Figure 9:
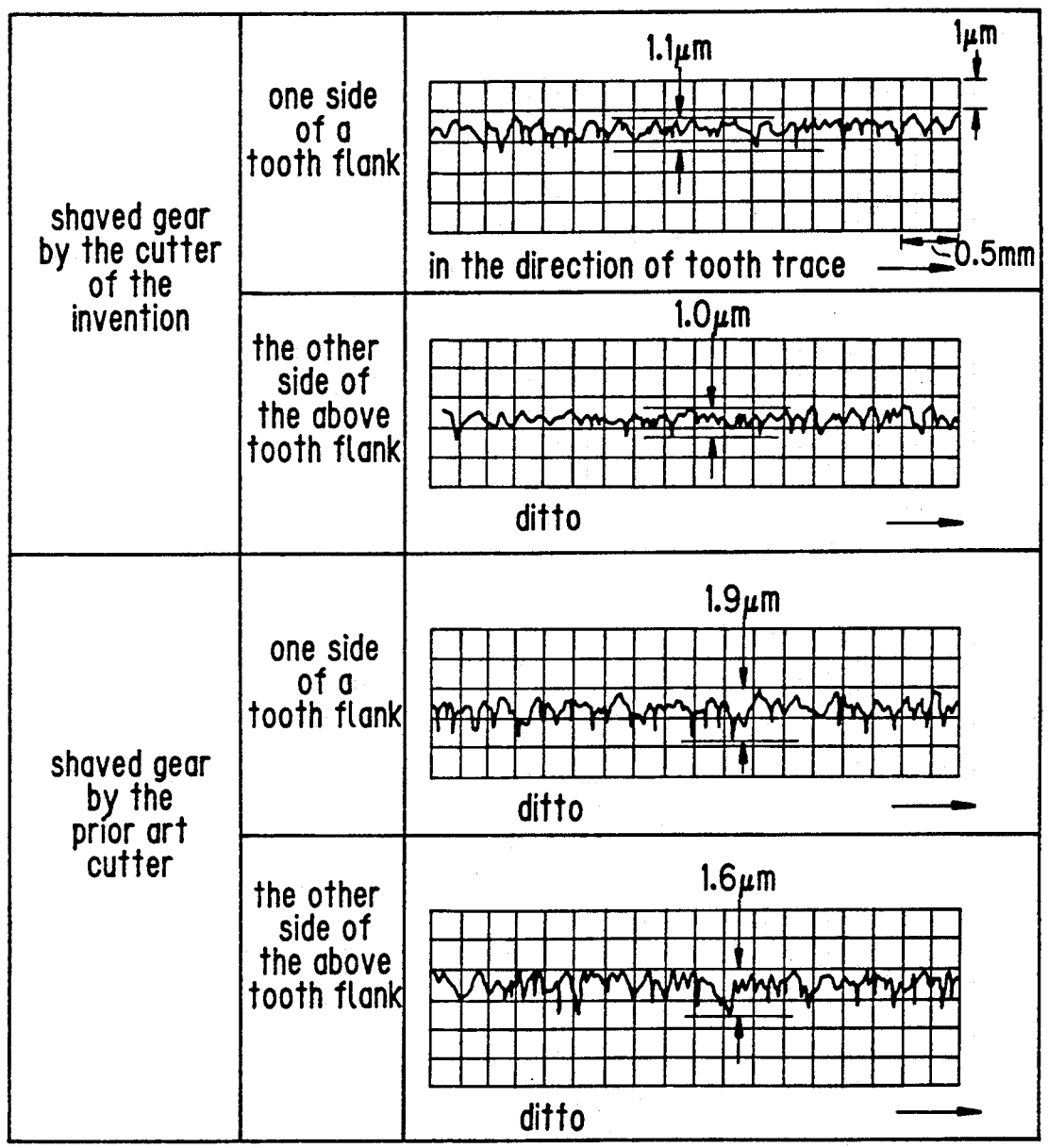

(a) Roughness of tooth flanks of shaved gears in the vicinity of the gear pitch circle as shown in FIG. 9.

It can be seen from FIG. 9 that the shaved gear using the prior art shaving cutter of normal serrations (see FIG. 12d) exhibits a face axial degree of 0.5~0.6 $\mu$m Ra (JIS B0601) i.e. surface roughness amounts 1.6 $\mu$m to 1.9 $\mu$m, while the shaved gear using the cutter of the present invention exhibits an improved face axial degree of 0.2~0.3 $\mu$m Ra (JIS B0601) i.e. surface roughness amounts 1.0 $\mu$m to 1.1 $\mu$m.

Figure 10:
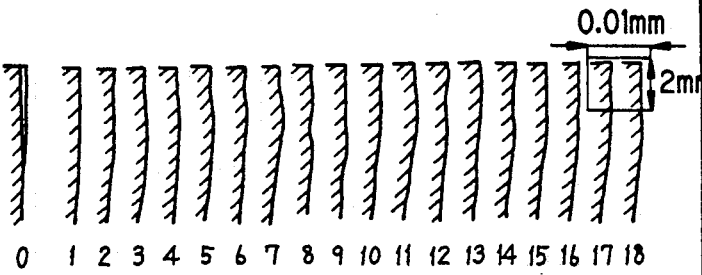

(b) Tooth profiles of all gear teeth measured respective shaved gears, wherein each zero (0) indicates the measured scatter of all following teeth 1 to 18 respectively as shown in FIG. 10.

FIG. 10 shows the measured results of tooth profiles of shaved gears, in which the shaved gear by the prior art cutter of normal serrations exhibits considerable deflection of the respective tooth profiles, whereas in the shaved gear by the cutter of the invention, all the tooth profiles are uniform.

(c) Runout of tooth grooves of shaved gears as shown in FIG. 11.

As obvious from FIG. 11, when observing differences before and after shaving gears, the shaved gear by the prior art cutter of normal serrations exhibits modification of the runout of work gear tooth grooves of the amount of 14 $\mu$m (36 $\mu$m minus 22 $\mu$m), whereas the shaved gear by the cutter of this invention exhibits a modification of 36 $\mu$m (45 $\mu$m minus 9 $\mu$m) which indicates an overwhelmingly highly modifying quality.

It will be easily understood from the above test results that, since the leading cutting edges of both sides of respective cutter tooth flanks have positive rake angles, they perform high and uniform cutting or shaving actions on both side of each of work gear teeth, and together with the burnishing effect effected by the trailing cutting edge during the reverse direction rotation inherent in the plunge shaving, the cutter results a highly accurate shaving work of gears.

FIGS. 4 to 8 show other embodiments of the present invention in which only one tooth crest of each of the shaving cutters is shown respectively in top view.

In FIG. 4, the positive rake angle ($\alpha1$) at the leading cutting edge 5la and the negative rake angle ($\beta1$) at the trailing cutting edge 5ta of each of the ribs 7a1 on one side of each of the tooth flanks are different from those ($\alpha2$) ($\beta2$) of the other side 7b1 of each of the tooth flanks. This cutter is adopted for the shaving of gears made of difficult machinable steel.

Also FIG. 5 shows a different embodiment of the present invention in which ribs 7a2, 7b2 are so arranged on both sides of each of the cutter tooth flanks that the ribs 7a2 on one side of each of the tooth flanks are set apart by length a in the axial direction of the tooth flanks from rib 7b2 of the other side of each of the tooth flanks.

This cutter is useful for, the shaving of gears having considerably great helix angle.

Figure 6B:
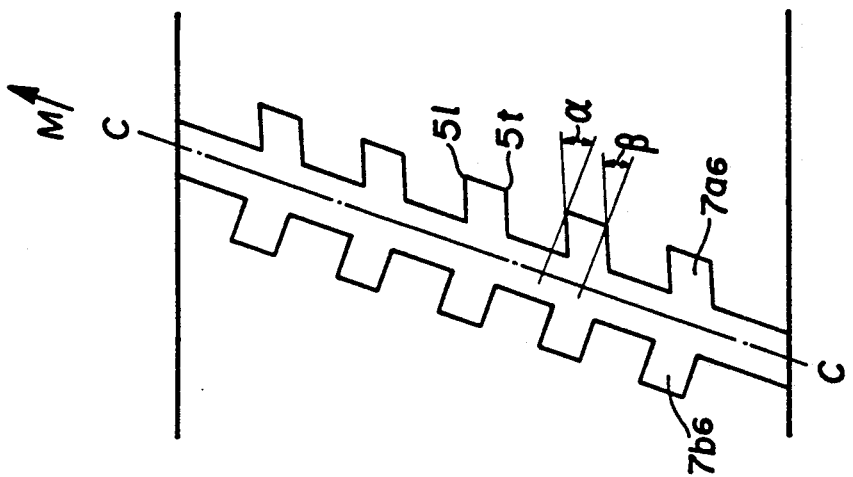

Further, FIG. 6a represents another embodiment in which, although positive/negative anges, and pitches between ajacent cutting edges are the same, an axial width l1 of each of the ribs 7a3 on one side of each of the tooth flanks is different from the axial width l2 of the ribs 7b 'of the other side of each of the tooth flanks FIG. 6b represents a different cutter having different rake angles $\alpha1$, $\alpha2$, $\beta1$, $\beta2$ and width l1, l2.

These cutters are for the shaving of gears made of easily machinable material and having a narrow tooth face width.

Figure 7:
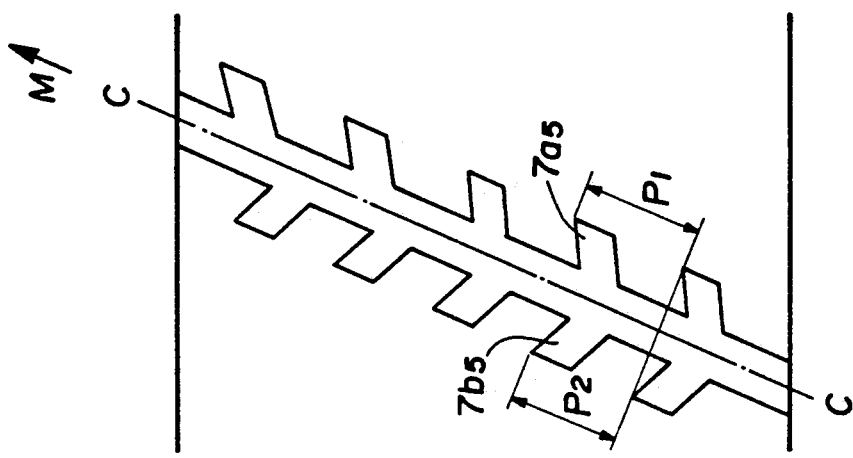

In FIG. 7, there is shown another embodiment of the cutter of the invention, in which ribs 7a5 on one side of each of the tooth flanks are arranged at a different axial pitch P1 in the direction of tooth flanks from the axial pitch P2 of the ribs 7b5 of the other side of each of the tooth flanks. This type of cutter is adapted for the shaving of gears mad of made soft steel and having a large number of teeth.

Figure 8:
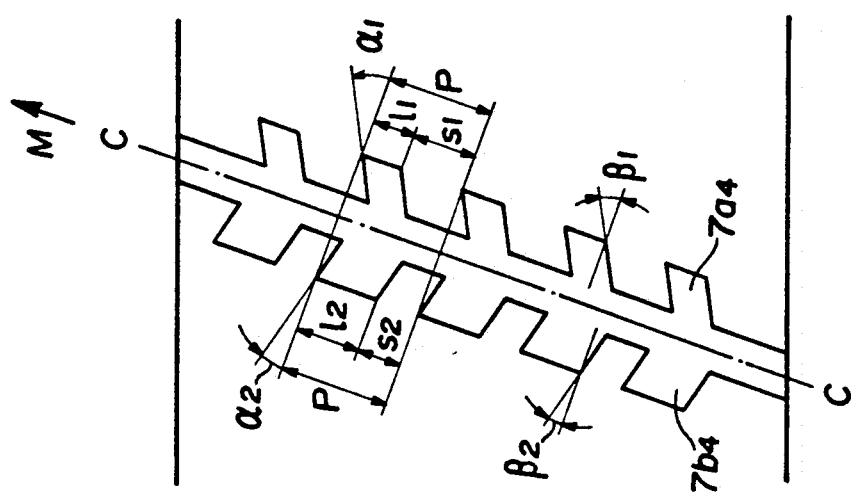

A final variation seen in FIG. 8 is an embodiment of a cutter having ribs so arranged that the ribs 7b6 on one side of each of the tooth flanks are ribs formed of normal serrations whereas that 7a6 of the other side of each of the tooth flanks have both a positive rake angle($\alpha$) at the leading cutting edge 5l and a negative rake angle($\beta$) at the trailing cutting edge 5t.

This cutter is useful to produce a more uniform finish on both sides of the work gear.

Although the illustrative embodiments of the present invention have been described in detail with reference to the accompanying drawings, it is to be understood that the present invention is not limited to those precise embodiments. Various changes or modifications may be effected therein by one skilled in the art without departing from the scope or spirit of the invention.

What is claimed is:

1. In a helical toothed shaving cutter for shaving of gears which cutter is provided with a multiplicity of serrations extending on the cutter tooth flanks and including ribs made up by said serrations of said cutter, said ribs forming said cutter tooth flanks, the improvement wherein said ribs are arranged on each side of an axial centerline of each of the cutter teeth and each of said ribs has a leading cutting edge having a positive rake angle and a trailing cutting edge having a negative rake angle as viewed in the direction of a lateral sliding of the teeth along the tooth trace of said cutter.

2. A shaving cutter according to claim 1, wherein said positive rake angle at the leading cutting edge, and said negative rake a angle at the trailing cutting edge, of each of said ribs on are differently formed so that each of said ribs one side of each of said teeth flanks has a different positive angle and a negative angle from those of the other side of each of said tooth flanks.

3. A shaving cutter according to claim 1, wherein said ribs are so arranged on both sides of each of said cutter tooth flanks those said ribs on one side of each of said tooth flanks are disposed offsetly in the axial direction of the tooth flanks from that of on the other side of each of said tooth flanks.

4. A shaving cutter according to claim 1, wherein said ribs are so arranged on both sides of each of said cutter tooth flanks that each of said ribs on one side of each of said tooth flanks has a different axial width from those of the other side of each of said tooth flanks.

5. A shaving cutter according to claim 1, wherein said ribs are so arranged on both sides of each of said cutter tooth flanks that each of said ribs on one side of each of said tooth flanks is arranged at a different axial pitch in the direction of said tooth flanks from those of the other side of each of said tooth flanks.

6. A helical toothed shaving cutter as defined in claim 1, wherein the ribs are arranged in a manner substantially symmetrically with respect to the axial centerline of each tooth.

7. A helical toothed shaving cutter for shaving of gears, comprising a plurality of teeth, each tooth having an axial center line, two flanks and a plurality of ribs disposed on each flank, the ribs being arranged to form serrations along the length of the flanks, each of the ribs having a leading cutting edge and a trailing cutting edge along the length of the flanks, wherein each of said ribs has a positive rake angle at the leading cutting edge and a negative rake angle at the trailing cutting edge as viewed in the direction of lateral sliding of the tooth along the tooth trace of said cutter.

8. A helical toothed shaving cutter as defined in claim 7, wherein the ribs are arranged in a manner substantially symmetrically with respect to the axial centerline of each tooth.

9. A helical toothed shaving cutter as defined in claim 7, wherein each of said ribs on one side of the axial centerline of each tooth has a different positive rake angle and a different negative rake angle from respective ones of the ribs on the other side of the axial centerline.

10. A helical toothed shaving cutter as defined in claim 7, wherein the ribs on one side of the axial centerline of each tooth are axially offset from ribs on the opposing side.

11. A helical toothed shaving cutter as defined in claim 7, wherein the ribs on one side of the axial centerline of each tooth have a different axial width from respective ones of the ribs on the opposing side of the centerline.

12. A helical toothed shaving cutter as defined in claim 7, wherein the ribs on one side of the axial centerline of each tooth are disposed at a different axial pitch than those on the opposing side.

13. A helical toothed shaving cutter for shaving of gears, comprising a plurality of teeth, each tooth having an axial center line, two flanks and a plurality of ribs disposed on each flank, the ribs being arranged to form serrations along the length of the flanks, each of the ribs having a leading cutting edge and a trailing cutting edge, wherein each of said ribs on one side of the axial centerline have a positive rake angle at the leading cutting edge and a negative rake angle at the trailing cutting edge and each of the ribs on the opposing side have zero rake angles at the leading and trailing edges, respectively, as viewed in the direction of lateral sliding of the tooth along the tooth trace of said cutter.

14. In a helical toothed shaving cutter for shaving of gears which is provided with a multiplicity of serrations extending on the cutter tooth flanks and including ribs made up by said serrations of said cutter, said ribs forming said tooth flanks, the improvement wherein said ribs are so arranged on said tooth flanks on both sides of said cutter that each of said ribs of the flank on one side of said tooth are formed by normal serrations where as the ribs of the flank on the other side of said tooth have a leading cutting edge having a positive rake angle and a trailing cutting edge having a negative rake angle as viewed in the direction of a lateral sliding of the teeth along the tooth trace of said cutter.

* * * * *